(12) United States Patent
Yamanaka et al.

(10) Patent No.: US 7,116,733 B2
(45) Date of Patent: Oct. 3, 2006

(54) AUTOMATIC GAIN CONTROL CIRCUIT AND AUTOMATIC GAIN CONTROL METHOD

(75) Inventors: Kazuya Yamanaka, Tokyo (JP); Shuji Murakami, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 806 days.

(21) Appl. No.: 10/139,368

(22) Filed: May 7, 2002

(65) Prior Publication Data
US 2002/0191717 A1    Dec. 19, 2002

(30) Foreign Application Priority Data
Jun. 14, 2001    (JP) ............................. 2001-180247

(51) Int. Cl.
  *H04L 27/08*    (2006.01)
(52) U.S. Cl. ..................................... 375/345
(58) Field of Classification Search ................. 375/345
  See application file for complete search history.

(56) References Cited

U.S. PATENT DOCUMENTS

| | | | | |
|---|---|---|---|---|
| 5,455,685 | A * | 10/1995 | Mori | 348/363 |
| 6,268,767 | B1 * | 7/2001 | Maalej et al. | 329/304 |
| 6,459,458 | B1 * | 10/2002 | Balaban | 348/678 |
| 6,668,027 | B1 * | 12/2003 | Scarpa | 375/345 |
| 6,721,549 | B1 * | 4/2004 | Lee et al. | 455/234.1 |
| 6,744,830 | B1 * | 6/2004 | Furukawa et al. | 375/345 |
| 2001/0003536 | A1 * | 6/2001 | Kurihara | 375/345 |

FOREIGN PATENT DOCUMENTS

JP    5-129862    5/1993

* cited by examiner

*Primary Examiner*—Chieh M. Fan
*Assistant Examiner*—Jia Lu
(74) *Attorney, Agent, or Firm*—Buchanan Ingersoll & Rooney PC

(57) ABSTRACT

In an automatic gain control circuit of a demodulating circuit, power values of pieces of symbol information I and Q of in-phase components and quadrature components of a modulated signal are calculated, a power difference between each power value and an ideal power value is detected, and an AGC control signal is produced to adjust a gain of the modulated signal according to the AGC control signal in a demodulating system including the demodulating circuit. Therefore, when an amount of noise included in the modulated signal is low, an average value of the power differences is reduced to zero, and the modulated signal can be correctly demodulated to a demodulated signal. To correctly demodulate the modulated signal including a large amount of noise, after the conversion of the AGC control signal, a sweep counter value is added to the AGC control signal so as to minimize a bit error rate of the demodulated signal. Thereafter, the ideal power value is corrected to reduce the average value of the power differences to zero even though the AGC control signal is corrected.

8 Claims, 10 Drawing Sheets

AUTOMATIC GAIN CONTROL CIRCUIT AND AUTOMATIC GAIN CONTROL METHOD

BACKGROUND OF THE INVENTION

1. Field of the Invention

The present invention relates to an automatic gain control circuit and an automatic gain control method which are used for a circuit for controlling the amplitude of an input signal according to a multi-phase modulation method or a quadrature modulation method.

2. Description of Related Art

A device such as a personal computer composed of digital circuits has been recently widespread, and digital data is transmitted and received through a communication network. Also, in the communication service such as television broadcasting, to increase a utilization ratio of a limited usable frequency band, service based on the digital communication technology has been put to practical use. In this digital communication technology, the quadrature amplitude modulation (hereinafter, called QAM) is often used as one of digital modulation types.

In the QAM, a sine function and a cosine function orthogonal to each other are used, digital data is transformed into both amplitude information and phase information, and the amplitude information and the phase information are transmitted.

FIG. 6 is a graphic view showing the vector location of 16-point QAM in which four values are given to each of an in-phase signal and a quadrature signal. In FIG. 6, the I-axis indicates the amplitude of a cosine wave denoting an in-phase component, and the Q-axis indicates the amplitude of a sine wave denoting a quadrature component. Each signal point (hereinafter, called symbol) designated by a black point in FIG. 6 indicates a composite vector of both the sine wave and the cosine wave, the symbols denote discrete signals output at regular intervals, and each symbol has 4-bit information.

Also, the phase shift keying (hereafter, called PSK) is known as one of the digital modulation types. In this PSK, a sine function and a cosine function orthogonal to each other are used in the same manner as in the QAM, digital data is transformed into phase information, and the phase information is transmitted.

FIG. 7 is a graphic view showing the vector location of 8-phase PSK in which the phase of an in-phase signal and the phase of a quadrature signal are respectively divided into eight pieces. In FIG. 7, the I-axis indicates the amplitude of a cosine wave denoting an in-phase component, and the Q-axis indicates the amplitude of a sine wave denoting a quadrature component. Each signal point (hereinafter, called symbol) designated by a black point in FIG. 7 indicates a composite vector of both the sine wave and the cosine wave, the symbols denote discrete signals output at regular intervals, and each signal has 3-bit information.

In cases where the digital service is performed by using a wire transmission line such as a cable, distortion relating to the amplitude direction of a modulated signal hardly occurs in the wire transmission line. Therefore, the QAM is generally used for the communication service using the wire transmission line. In contrast, in case of the satellite communication using a radio transmission line, distortion relating to the amplitude direction of a modulated signal easily occurs due to characteristics of an amplifier placed at the relay point of a satellite. Therefore, the PSK is generally used for the communication service using the radio transmission line.

FIG. 8 is a constitutional view showing a general carrier wave reproducing system (hereinafter, called a demodulating system) for both a wave modulated according to the QAM and a wave modulated according to the PSK. In FIG. 8, 1 indicates a tuner for receiving a modulated signal modulated according to the QAM or PSK, 2 indicates a band pass filter, 3 indicates a gain changeable amplifier (hereinafter, called an AGC amplifier), 4 indicates an oscillator, 5 indicates a frequency changer, 6 indicates an analog-to-digital converter (hereinafter, called AID converter), and 7 indicates a carrier wave reproducing circuit (hereinafter, called a demodulating circuit).

An operation of the demodulating system will be described.

A high-frequency modulated signal such as a ground wave or a satellite wave transmitted through a wire transmission line or a radio transmission line is received in the tuner 1, and a high frequency of a transmission band in the modulated signal is changed in the tuner 1 to a constant frequency called an intermediate frequency ranging from 50 to 30 MHz.

Thereafter, noise existing out of the transmission band of the intermediate frequency is removed from the modulated signal in the band pass filter 2, the intermediate frequency of the modulated signal is changed to a low-band frequency in the frequency changer 5, and the modulated signal is input to the A/D converter 6. In the A/D converter 6, the analog modulated signal is converted into a digital modulated signal, and the digital modulated signal is input to the demodulating circuit 7. Thereafter, in the demodulating circuit 7, a digital process is performed for the input modulated signal to demodulate the input modulated signal to a demodulated signal, and digital data included in the demodulated signal is obtained.

In this case, to maintain a conversion precision in the A/D converter 6, the demodulating circuit 7 is required to maintain an average amplitude of the analog modulated signal input to the A/D converter 6. Therefore, an operation for maintaining a gain of the signal input to the A/D converter 6 is performed by the AGC amplifier 3 under the control of an AGC control signal output from an automatic gain control circuit of the demodulating circuit 7.

FIG. 9 is a constitutional view showing a general demodulating circuit. In FIG. 9, 11 indicates a multiplier, 12 indicates another multiplier, 13 indicates a low pass filter (hereinafter, called LPF), 14 indicates another low pass filter (hereinafter, called LPF), 28 indicates a conventional automatic gain control circuit, 15 indicates a de-rotator formed of a complex multiplier, 16 indicates a phase comparator, 17 indicates a loop filter, 18 indicates a numerical control oscillator (hereinafter, called NCO), 19 indicates a decoder, and 20 indicates an error correction circuit.

The input modulated signal input to a data input terminal of the demodulating circuit 7 is processed in digital circuits because the input modulated signal has been already converted into digital values in the A/D converter 6. The phase of the input modulated signal is detected in the multiplier 11 by using a local oscillating signal having a waveform of a cosine wave. Also, the phase of the input modulated signal is detected in the multiplier 12 by using a local oscillating signal having a waveform of a sine wave. Therefore, the input modulated signal is divided into in-phase components of symbols and quadrature components of the symbols. The in-phase component and the quadrature component of each symbol is orthogonal to each other. Here, each of the local oscillating signals respectively having a fixed frequency is output from a local oscillator. The in-phase components obtained in the multiplier 11 are input to the LPF 13, the quadrature components obtained in the multiplier 12 are input to the LPF 14, and the spectral reshaping is performed for the in-phase components and the quadrature components. Here, a frequency characteristic of the LPF 13 is the same as that of the LPF 14.

Each of the LPFs 13 and 14 is formed of a roll off filter or a root roll off filter in which a transfer characteristic required for the prevention of an inter-symbol interference in the digital data transmission is obtained. Therefore, in cases where the transfer characteristic is combined with a filter characteristic of a transmission end of the modulated signal, a raised cosine characteristic can be obtained to prevent the inter-symbol interference.

Both the in-phase component and the quadrature component of each symbol of the input modulated signal output from the LPFs 13 and 14 are input to the automatic gain control circuit 28. In the automatic gain control circuit 28, a power value of each symbol of the input modulated signal is calculated from information of the symbol, the calculated power value of each symbol is compared with a referential power value which corresponds to the modulation type adopted for the input modulated signal, and a difference between the power value of each symbol of the input modulated signal actually received and the referential power value is detected. Here, a referential power value corresponding to each of a plurality of modulation types is stored in advance in the automatic gain control circuit 28. Thereafter, an AGC control signal indicating the detected power differences of the symbols is output from the automatic gain control circuit 28 of the demodulating circuit 7 and is received in both an AGC amplifier arranged in the tuner 1 and the AGC amplifier 3. Therefore, the gain of the analog modulated signal input to the A/D converter 6 is maintained to a constant value according to the AGC control signal.

Also, the in-phase components and the quadrature components of the symbols of the input modulated signal output from the LPFs 13 and 14 are received in the de-rotator 15. Also, a data conversion digital signal SIN obtained from an analog sine signal and a data conversion digital signal COS obtained from an analog cosine signal are output from the NCO 18 and are received in the de-rotator 15. In the de-rotator 15, a phase shift and a frequency shift occurring between the in-phase components and the quadrature components of the input modulated signal are corrected.

Thereafter, the in-phase components and the quadrature components of the symbols corrected in the de-rotator 15 are received in both the decoder 19 and the phase comparator 16 as pieces of symbol information. In the decoder 19, the pieces of symbol information are converted into bit string data. In the phase comparator 16, an ideal phase of each symbol is predicted, and a difference between the ideal phase of the symbol and the phase of the symbol actually received is detected as a phase error for each symbol. Thereafter, each detected phase error is smoothed in the loop filter 17, and a digital signal indicating the smoothed phase errors is input to a frequency control terminal of the NCO 18. In the NCO 18, a signal having a frequency proportional to the frequency of the digital signal is produced. Also, the NCO 18 has a data converting function. Therefore, the data conversion signal SIN and the data conversion signal COS respectively having a frequency proportional to the frequency of the digital signal are output from the NCO 18 and are received in the de-rotator 15 as information used to correct both a phase shift and a frequency shift of the input modulated signal.

When both the phase shift and the frequency shift of the input modulated signal are removed from the output of the de-rotator 15, the bit string data output from the decoder 19 agrees with the digital data included in the modulated signal. Therefore, the modulated signal is demodulated to demodulated data, and the digital data is reproduced.

However, error is included in the demodulated data due to the influence of noise which occurs in dependence on environments of the transmission line. The relation between an amount of noise and a bit error rate of the demodulated data is theoretically determined for each modulation type. Because noise necessarily occurs in all types of transmission lines, the bit error necessarily occurs in the modulated signal transmitted through any type of transmission line.

Also, the data processing is performed for the demodulated data in latter stages of the demodulating system on the assumption that the modulated signal received is correctly demodulated to the bit string data. Therefore, in cases where bit error exists in the bit string data, even though a home page of an internet is, for example, opened, a picture registered in the home page is not displayed. To remove the bit error from the bit string data, the error correcting circuit 20 is arranged in the demodulating system.

Therefore, even though the bit string data output from the decoder 19 includes bit error, when a bit error rate of the bit error included in the bit string data is equal to or lower than an allowable error bit rate, the bit error included in the bit string data can be corrected in the error correcting circuit 20 so as to make the bit string data perfectly agree with the digital data output from a transmission end of the modulated signal. The error correcting circuit 20 is formed of a trellis decoder, a Viterbi decoder, a Read-Solomon decoder, or the combination of those decoders. Therefore, an output signal OUT of the error correcting circuit 20 denotes the output of the demodulating system.

FIG. 10 is a constitutional view showing the conventional automatic gain control circuit 28 arranged in the demodulating circuit 7.

In FIG. 10, 21 indicates a power calculating circuit for performing a square calculation for each piece of symbol information. 22 indicates a root calculating circuit for calculating a square root of a calculation result obtained in the power calculating circuit 21 as a power value of one symbol for each symbol. 23 indicates an adder for subtracting a reference value (hereinafter, called AGCR) from a power value of each symbol output from the root calculating circuit 22 and outputting a power difference for each symbol. The reference value expresses an ideal power value of the symbols relating to the corresponding modulation type, and a plurality of ideal power values are prescribed and stored for a plurality of modulation types in one-to-one correspondence. 24 indicates a multiplier for multiplying the power difference output from the adder 23 by a foxed gain (hereinafter, called AGCG) for each symbol. 25 indicates a loop filter for averaging a plurality of multiplication results of the multiplier 24. 26 indicates a pulse width modulator for producing the AGC control signal AGCPWM in which the output of the loop filter 25 is expressed by a pulse width.

Next, an operation of the conventional automatic gain control circuit 28 will be described.

Pieces of symbol information I of the in-phase components of the symbols and pieces of symbol information Q of the quadrature components of the symbols are output from the LPFs 13 and 14 and are received in the power calculating circuit 21. In the power calculating circuit 21, the piece of symbol information I of each in-phase component is squared to obtain a squared value $I^2$, the piece of symbol information Q of each quadrature component is squared to obtain a squared value $Q^2$, and the squared value $I^2$ and the squared value $Q^2$ are added together to obtain $I^2+Q^2$ for each symbol. Thereafter, the square root of the calculation result $I^2+Q^2$ of the power calculating circuit 21 is extracted in the root calculating circuit 22 for each symbol, and a power value $\sqrt{(I^2+Q^2)}$ of each symbol is obtained. Here, the root calculating circuit 22 is generally formed of a read only memory.

Thereafter, the power value of each symbol is compared with the AGCR, which denotes a reference value expressing an ideal power value of the symbols and is prescribed for the corresponding modulation type, in the adder 23, and a difference between the power value and the AGCR is detected for each symbol. The AGCR is obtained by calculating an average of the power values of all symbols positioned according to an ideal symbol location of the symbols, so that the AGCR denotes an ideal power value. The value of the AGCR depends on the modulation type. Thereafter, the difference between the power value of each symbol and the AGCR denoting an ideal power value is multiplied by the AGCG denoting a fixed gain in the multiplier 24, and an average of multiplied values obtained in the multiplier 24 is calculated in the loop filter 25. The average value obtained in the loop filter 25 is changed to the AGC control signal AGCPWM having a direct current component in the pulse width modulator 26 (or a digital-to-analog converter not shown), and the direct current component of the AGC control signal is fed back to both the AGC amplifier 3 and an AGC amplifier of the tuner 1 so as to control the amplitude of the signal input to the A/D converter 6 to a constant value.

Next, another conventional automatic gain control circuit operated according to a peak power control method is described.

FIG. 11 is a constitutional view of another conventional automatic gain control circuit. In FIG. 11, 31 indicates a power calculating circuit, 32 indicates a threshold value counter, and 33 indicates a pulse width modulator. A peak power control method is often used in a demodulating system based on the PSK in which phase information is only used and the amplitude of a modulated signal, or a power value of each symbol, is always constant.

Pieces of symbol information I of the in-phase components of the symbols and pieces of symbol information Q of the quadrature components of the symbols are output from the LPFs 13 and 14 and are received in the power calculating circuit 31. In the power calculating circuit 31, the piece of symbol information I of each in-phase component is squared, the piece of symbol information Q of each quadrature component is squared, and the squared value $I^2$ and the squared value $Q^2$ are added together to obtain $I^2+Q^2$ for each symbol. Thereafter, the square root of the calculation result $I^2+Q^2$ of the power calculating circuit 31 is extracted in a root calculating circuit (not shown) for each symbol, a power value $\sqrt{(I^2+Q^2)}$ of each symbol is obtained. Therefore, a power value of each symbol of the input modulated signal is calculated. In this case, in cases where the input modulated signal is produced according to the PSK, because the value $I^2+Q^2$ is constant, the calculation of the square root of the calculation result $I^2+Q^2$ in the root calculating circuit can be omitted.

Thereafter, in the threshold value counter 32, the number of symbols, of which the calculated power values are higher than a first threshold value obtained by adding a constant value to the ideal power value, is counted as a counted value during a predetermined time period, or the number of symbols, of which the calculated power values are lower than a second threshold value obtained by subtracting a constant value from the ideal power value, is counted as a counted value during a predetermined time period. The counted value is used to increase or decrease the amplitude of the modulated signal input to the A/D converter 6. In detail, the counted value of the threshold value counter 32 is changed to an AGC control signal AGCPWM having a direct current component in the pulse width modulator 33 (or a digital-to-analog converter not shown), and the direct current component of the AGC control signal is fed back to both the AGC amplifier 3 and an AGC amplifier of the tuner 1 so as to control the amplitude of the modulated signal input to the A/D converter 6 to a constant value.

Accordingly, the amplitude of the modulated signal input to the A/D converter 6 can be controlled by calculating a degree of control for both the AGC amplifier 3 and the AGC amplifier of the tuner 1 according to only the power information indicated by the symbol information I and Q.

However, there is probability that a large amount of noise is included in the input modulated signal, a reflected signal generated due to the mismatching of the transmission lines is superposed on the symbol information I and Q, and/or unnecessary radiation such as spurious radiation occurs in the transmission frequency band of the input modulated signal. In this case, because a power value of an unnecessary signal included in the symbol information I and Q is added to the power information indicated by the symbol information I and Q, the power value indicated by the symbol information I and Q cannot be correctly calculated. As a result, the amplitude of the modulated signal input to the A/D converter 6 becomes unstable so as to be out of the dynamic range of the A/D converter 6, the A/D conversion is not correctly performed in the A/D converter 6, the decoding in the decoder 19 of the demodulating circuit 7 is not correctly performed, and a bit error rate of the bit string data output from the decoder 19 becomes worse. Therefore, even though the modulated signal received in the tuner 1 includes a small amount of noise, there is probability that a bit error rate of the bit string data output from the decoder 19 exceeds the allowable error bit rate, and the bit error included in the bit string data cannot be perfectly corrected in the error correcting circuit 20. Accordingly, a problem has arisen that the demodulating system including the automatic gain control circuit is unstably operated.

SUMMARY OF THE INVENTION

An object of the present invention is to provide, with due consideration to the drawbacks of the conventional automatic gain control circuit, an automatic gain control circuit of a demodulating circuit and an automatic gain control method in which the demodulating circuit is stably operated while minimizing a bit error rate of data produced in the demodulating circuit.

The object is achieved by the provision of an automatic gain control circuit of a demodulating circuit, which has an automatic gain control amplifier for adjusting a gain of a modulated signal, comprising difference detecting means for calculating a plurality of power values of pieces of symbol information of in-phase components and quadrature components of the modulated signal and detecting a power difference between each calculated power value and an ideal power value, control means for producing an AGC control signal to reduce an average value of the power differences detected by the difference detecting means to zero by controlling the automatic gain control amplifier according to the AGC control signal, first correcting means for minimizing a bit error rate of data, which is obtained from the modulated signal in the demodulating circuit, by correcting the AGC control signal produced by the control means, and second correcting means for correcting the ideal power value to reduce an average value of the power differences detected by the difference detecting means, in which the power differences are detected from the modulated signal adjusted by the automatic gain control amplifier according to the AGC control signal corrected by the first correcting means, to zero.

Also, the object is achieved by the provision of an automatic gain control method, comprising the steps of calculating a plurality of power values of pieces of symbol information of in-phase components and quadrature components of a modulated signal, detecting a power difference between each power value and an ideal power value, producing an AGC control signal to reduce an average value of the power differences to zero by adjusting a gain of the modulated signal according to the AGC control signal, minimizing a bit error rate of data, which is obtained from the modulated signal, by correcting the AGC control signal to a corrected AGC control signal after the conversion of the AGC control signal, and correcting the ideal power value after the completion of the minimization of the bit error rate to reduce an average value of the power differences, which are detected from the modulated signal adjusted according to the corrected AGC control signal, to zero.

In the above configuration or steps, even though a large amount of noise is included in the modulated signal, the AGC control signal is corrected by the first correcting means so as to minimize a bit error rate of data obtained from the modulated signal. Also, even though an average value of the power differences is shifted from zero due to the correction of the AGC control signal, the average value of the power differences is reduced to zero by the second correcting means by correcting the ideal power value.

Accordingly, the demodulating circuit including the automatic gain control circuit can be stably operated while minimizing the bit error rate of the data produced in the demodulating circuit.

It is preferred that each power difference detected by the difference detecting means is multiplied by a prescribed gain by the second correcting means to produce a multiplied value, and the multiplied value is added to the ideal power value by the second correcting means to produce a corrected ideal power value and to detect power differences produced from the corrected ideal power value.

Also, it is preferred that the step of correcting the ideal power value comprises the steps of multiplying the power difference between each power value and the ideal power value by a prescribed gain to produce a multiplied value, and adding the multiplied value to the ideal power value to produce a corrected ideal power value and to detect power differences produced from the corrected ideal power value.

Therefore, the ideal power value can be corrected without complicating the configuration of the automatic gain control circuit.

Also, it is preferred that each power difference detected by the difference detecting means is multiplied by a prescribed gain by the second correcting means to produce a multiplied value, the multiplied value is transmitted through a loop filter of the second correcting means, the multiplied value transmitted through the loop filter is added to the ideal power value to produce a corrected ideal power value and to detect power differences produced from the corrected ideal power value.

Also, it is preferred that the step of correcting the ideal power value comprises the steps of multiplying the power difference between each power value and the ideal power value by a prescribed gain to produce a multiplied value, transmitting the multiplied value through a loop filter, and adding the multiplied value transmitted through the loop filter to the ideal power value to produce a corrected ideal power value and to detect power differences produced from the corrected ideal power value.

Therefore, the ideal power value can be corrected while suppressing a large change of the ideal power value.

Also, it is preferred that the bit error rate of the data is monitored by the first correcting means while a correction value added to the AGC control signal to correct the AGC control signal is changed, and the correction value is fixed to a specific correction value by the first correcting means on condition that the bit error rate of the data is minimized by adding the specific correction value to the AGC control signal.

Also, it is preferred that the step of minimizing the bit error rate of the data comprises the steps of monitoring the bit error rate of the data while a correction value added to the AGC control signal to correct the AGC control signal is changed, and fixing the correction value to a specific correction value on condition that the bit error rate of the data is minimized by adding the specific correction value to the AGC control signal.

Therefore, the AGC control signal can be corrected without complicating the configuration of the automatic gain control circuit.

Also, it is preferred that the correction value is changed under control of an external control unit by the first correcting means.

Also, it is preferred that the step of monitoring the bit error rate comprises the step of changing the correction value under control of an external control unit.

Therefore, the AGC control signal can be easily corrected without complicating the configuration of the automatic gain control circuit.

Also, it is preferred that the first correcting means has an external control unit for correcting the AGC control signal.

Also, it is preferred that the step of minimizing the bit error rate of the data comprises the step of correcting the AGC control signal under control of an external control unit.

Therefore, the AGC control signal can be easily corrected.

DETAILED DESCRIPTION OF THE PREFERRED EMBODIMENTS

Embodiments of the present invention will now be described with reference to the accompanying drawings.

Embodiment 1

Figure 1:
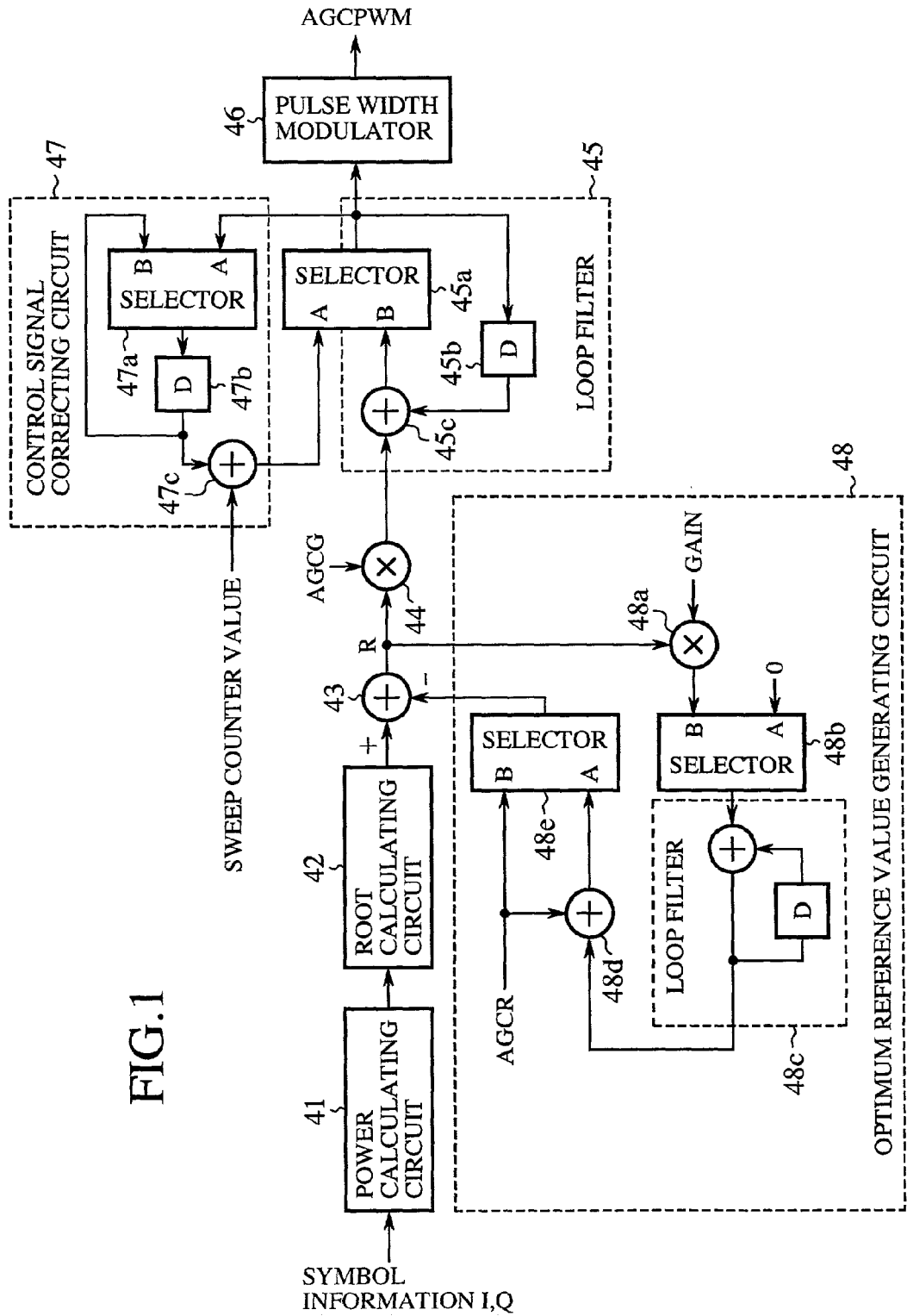
FIG. 1 is a constitutional view showing an automatic gain control circuit arranged in a demodulating circuit according to a first embodiment of the present invention.

FIG. 1 is a constitutional view showing an automatic gain control circuit arranged in a demodulating circuit according to a first embodiment of the present invention.

In FIG. 1, 41 indicates a power calculating circuit for performing a square calculation for the symbol information I of each in-phase component and the symbol information Q of each quadrature component and adding the square value $I^2$ of the symbol information I and the square value $Q^2$ of the symbol information Q for each symbol. 42 indicates a root calculating circuit for calculating a square root of the calculation result of the power calculating circuit 41 as a power value for each symbol. 43 indicates an adder for subtracting an optimum reference value from the power value of each symbol output from the root calculating circuit 42 to obtain a power difference for each symbol. A difference detecting means comprises the power calculating circuit 41, the root calculating circuit 42 and the adder 43.

44 indicates a multiplier for multiplying the power difference output from the adder 43 by a fixed gain (hereinafter, called AGCG) to obtain a multiplied value for each symbol. 45 indicates a loop filter for calculating an average value of the multiplied values obtained in the multiplier 44 and outputting a digital control signal having the average value of the multiplied values. The loop filter 45 comprises a selector 45a, a D flip-flop 45b and an adder 45c. 46 indicates a pulse width modulator for producing an AGC control signal in which the average value of the digital control signal obtained in the loop filter 45 is expressed by a pulse width. A control means comprises the multiplier 44, the loop filter 45 and the pulse width modulator 46.

47 indicates a control signal correcting circuit (or a first correcting means) for waiting the convergence of the control for both the AGC amplifier 3 and the AGC amplifier of the tuner 1 and correcting the digital control signal output from the loop filter 45 so as to minimize a bit error rate of the bit string data output from the decoder 19. The control signal correcting circuit 47 comprises a selector 47a, a D flip-flop 47b for holding the digital control signal output from the loop filter 45, and an adder 47c for adding a sweep counter value to the digital control signal held in the D flip-flop 47b.

48 indicates an optimum reference value generating circuit (or a second correcting means) for waiting the completion of the correcting operation performed in the control signal correcting circuit 47, correcting a reference value (hereinafter, called AGCR) denoting an ideal power value prescribed for the corresponding modulation type so as to reduce the power difference output from the adder 43 to zero, and outputting a corrected AGCR as an optimum reference value. In the optimum reference value generating circuit 48, 48a indicates a multiplier for multiplying the power difference output from the adder 43 by a gain having a prescribed value to obtain a multiplied value for each symbol, 48b indicates a selector for selecting each multiplied value obtained in the multiplier 48a or a zero value, 48c indicates a loop filter for calculating an average value of the multiplied values obtained in the multiplier 48a, 48d indicates an adder for adding the AGCR to the average value calculated in the loop filter 48c to obtain a summed value, and 48e indicates a selector for selecting the AGCR or the summed value obtained in the adder 48d.

Figure 2:
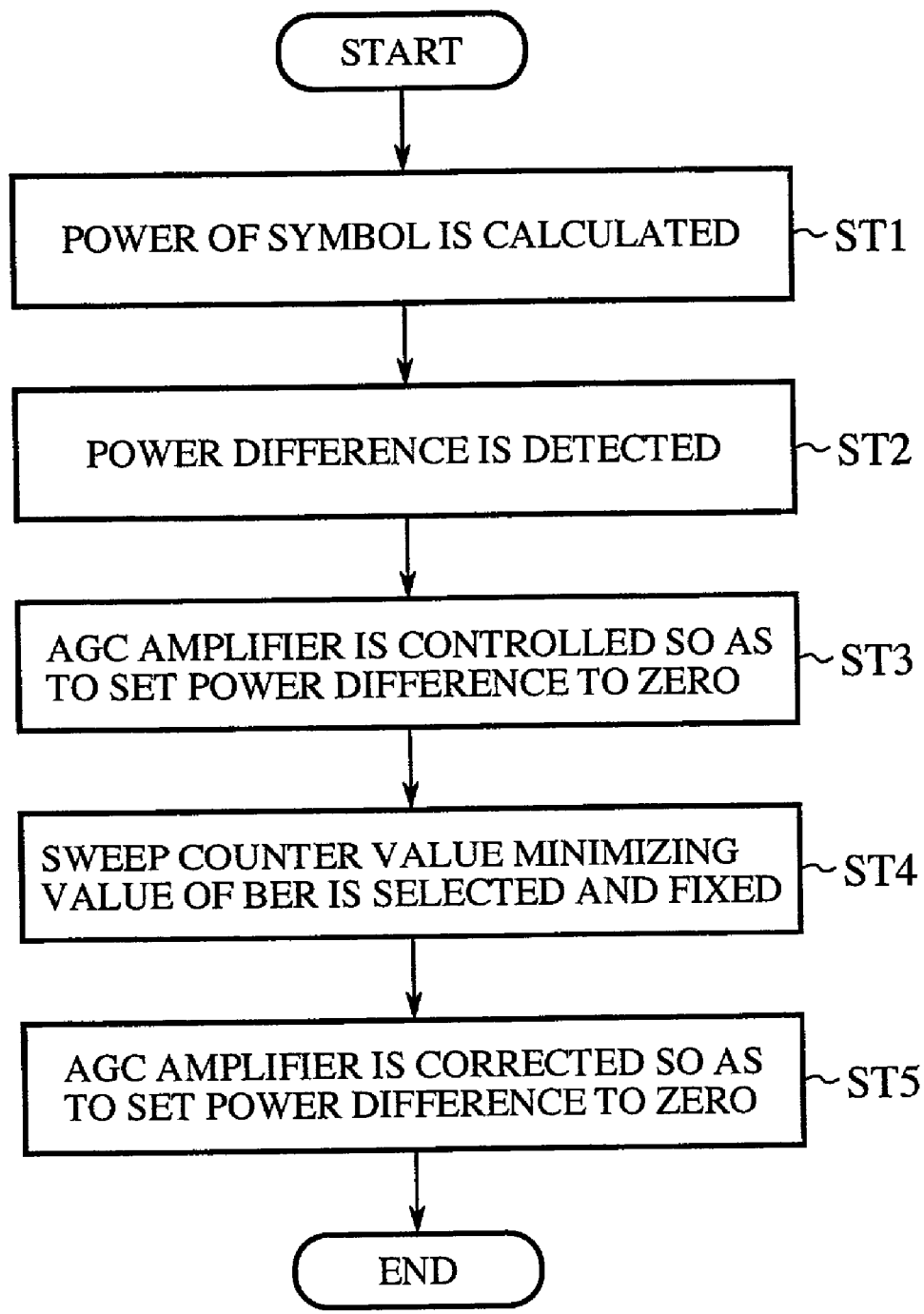
FIG. 2 is a flow chart showing an automatic gain control method according to the first embodiment of the present invention.

FIG. 2 is a flow chart showing an automatic gain control method according to the first embodiment of the present invention.

Next, an operation of the automatic gain control method will be described below.

Pieces of symbol information I of the in-phase components of the symbols and pieces of symbol information Q of the quadrature components of the symbols are output from the LPFs 13 and 14 and are received in the power calculating circuit 41. In the power calculating circuit 41, the piece of symbol information I of each in-phase component is squared to obtain a squared value $I^2$, the piece of symbol information Q of each quadrature component is squared to obtain a squared value $Q^2$, and the squared value $I^2$ and the squared value $Q^2$ are added together to obtain a sum $I^2+Q^2$ for each symbol. Thereafter, the square root of the calculation result $I^2+Q^2$ of the power calculating circuit 41 is extracted in the root calculating circuit 42 for each symbol, and a power value $\sqrt{(I^2+Q^2)}$ of each symbol is obtained (step ST1). Therefore, a power value of each symbol of the input modulated signal is calculated. Here, the root calculating circuit 42 is formed of a read only memory.

Thereafter, an optimum reference value expressing an optimum average power of the symbols is generated in the optimum reference value generating circuit 48, the optimum reference value is subtracted from the power value of each symbol output from the root calculating circuit 42 in the adder 43, and a power difference between the optimum reference value and the power value of each symbol is detected (step ST2). A method for calculating the optimum reference value expressing the optimum average power of the symbols is described later.

Thereafter, the power difference of each symbol is multiplied in the multiplier 44 by the AGCG denoting a fixed gain, and an average value of the power differences of the symbols is obtained in the modified loop filter 45. Thereafter, the average value of the power differences is changed to an AGC control signal AGCPWM having a direct current component in the pulse width modulator 46 (or a digital-to-analog converter not shown), and the direct current component of the AGC control signal is fed back to both the AGC amplifier 3 and the AGC amplifier of the tuner 1 so as to control the amplitude of the signal input to the A/D converter 6 to a constant value (step ST3).

The operation for correcting the digital control signal output from the loop filter 45 to the pulse width modulator 46 will be described below in detail.

In a principal idea of the first embodiment, a sweep operation is performed to determine an optimum pulse width modulation (PWM) value of the digital control signal output from the loop filter 45, and an optimum reference value is calculated so as to produce the digital control signal having the optimum PWM value. In this case, various operations are performed, and each operation is transferred to another operation. The operation transfer is expressed by the selection change of the four selectors 48e, 48b, 45a and 47a. Therefore, the operations are described according to the selector selections.

Figure 8:
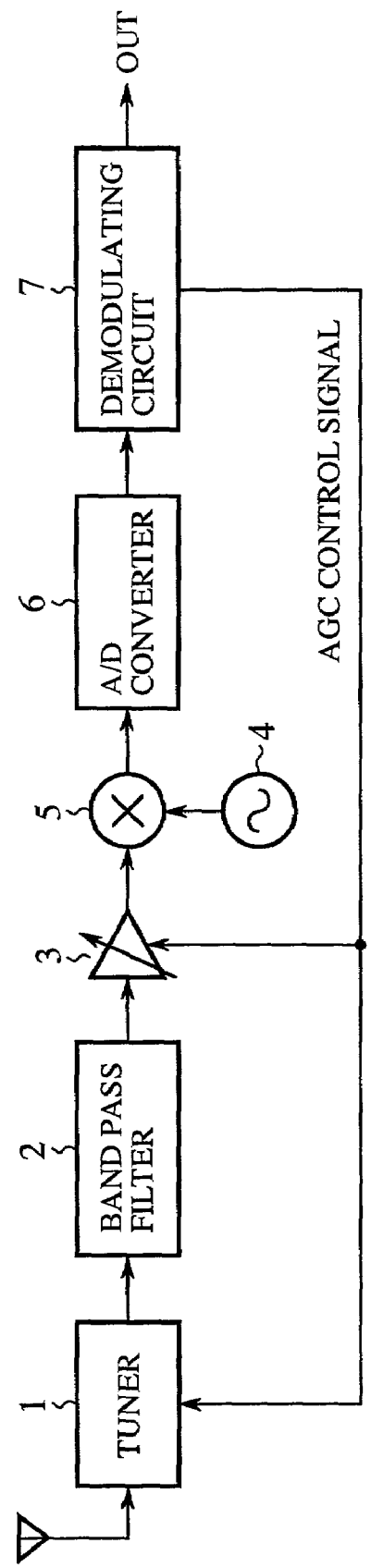
FIG. 8 is a constitutional view showing a general carrier wave reproducing system for both a wave modulated according to the QAM and a wave modulated according to the PSK.
Figure 9:
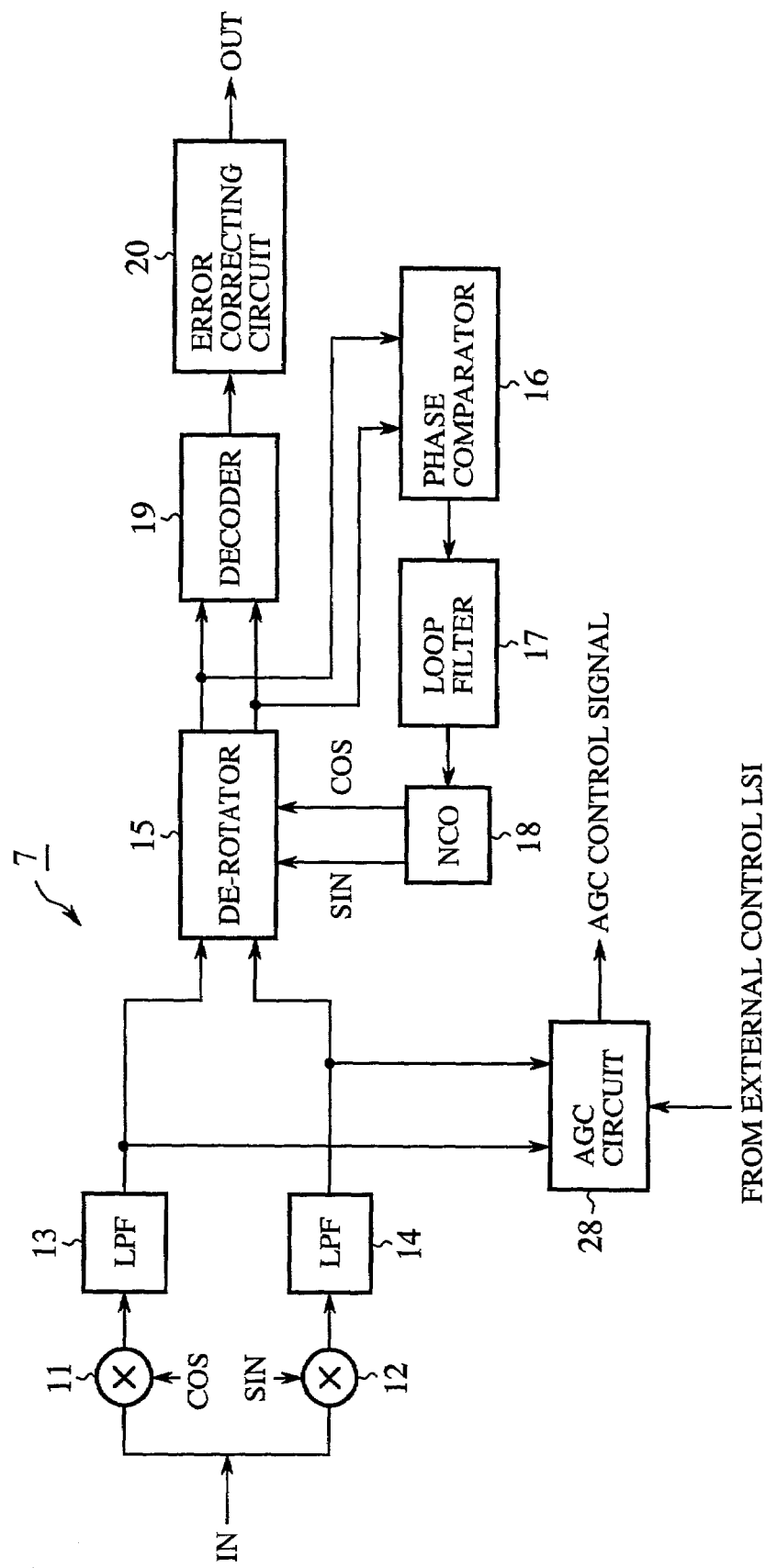
FIG. 9 is a constitutional view showing a general demodulating circuit.

When the electric power is supplied to the demodulating system shown in FIG. 8 or the demodulating system is set to a reset state, the amplitude of the AGC control signal AGCPWM output from the pulse width modulator 46 of the demodulating circuit 7 is stabilized by using the AGCR in the automatic gain control circuit, and the amplitude of the modulated signal input to the A/D converter 6 is converged to a constant value. In detail, the selector 48e selects a signal input to a terminal B, the selector 48b selects a signal input to a terminal A, the selector 45a selects a signal input to a terminal B, and the selector 47a selects a signal input to a terminal A. In this selector selection simply expressed by (selector 48e, selector 48b, selector 45a, selector 47a)=(B, A,B,A), the AGCR is selected in the selector 48e and is output to the adder 43. Also, the zero value selected in the selector 48b is sent to the adder 48d through the loop filter 48c, the AGCR is added to the zero value, and the output of the adder 48d is sent to the selector 48e. However, because the AGCR is selected in the selector 48e, the output of the adder 48d has no influence on the adder 43.

Figure 10:
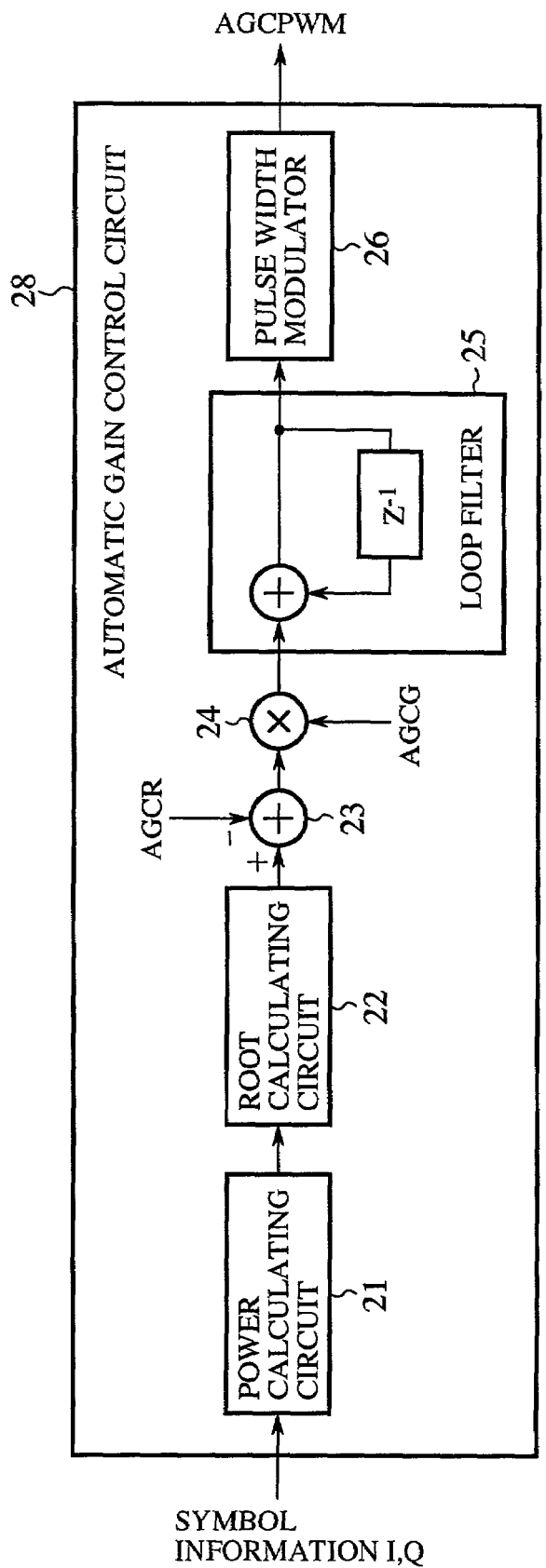
FIG. 10 is a constitutional view showing a conventional automatic gain control circuit arranged in the demodulating circuit.
Figure 11:
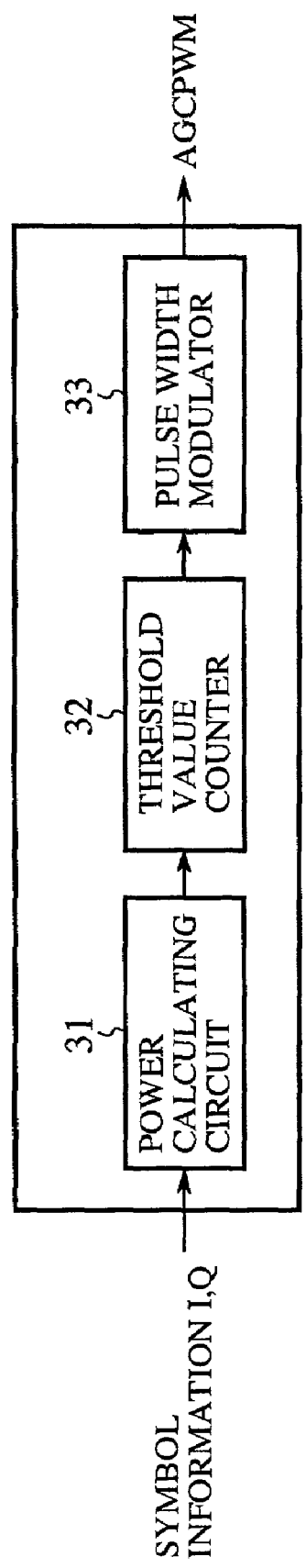
FIG. 11 is a constitutional view of another conventional automatic gain control circuit arranged in the demodulating circuit.

Also, because a signal output from the adder 45c is selected in the selector 45a, the signal output from the adder 45c is output to both the selector 47a and the pulse width modulator 46. Also, though the signal output from the loop filter 45 is selected in the selector 47a, a sum of the output signal of the loop filter 45 and a sweep counter value is not selected in the selector 45a. Therefore, an output of the control signal correcting circuit 47 is not used in the automatic gain control circuit. Accordingly, the operation performed in the automatic gain control circuit is the same as that of the conventional automatic gain control circuit 28 shown in FIG. 10.

Thereafter, carrier recovery is converged in the same operation as that of the conventional automatic gain control circuit to correct a phase shift and a frequency shift occurring between the in-phase components and the quadrature components of the input modulated signal in the de-rotator 15. Thereafter, when the output signal OUT of the error correcting circuit 20 is converged so as to be possible to measure a bit error rate of the bit string data output from the decoder 19, the selection in the selectors is changed to the next selection (selector 48e, selector 48b, selector 45a, selector 47a)=(B,A,A,B), and a sweep operation is performed to determine an optimum pulse width modulation (PWM) value of the digital control signal output from the loop filter 45.

In this embodiment, a sweep counter used to output a digital control signal having the PWM value from the loop filter 45 is arranged in an external control LSI placed on the outside of the demodulating circuit 7. The external control LSI denotes an external control unit normally called a microcomputer. The reason that the external control LSI placed on the outside is used is because the external control LSI placed on the outside is necessary to control the demodulating system. Therefore, the external control LSI necessary for the demodulating system is used as a sweep counter. However, it is applicable that a sweep counter be arranged in the inside of the demodulating system to output the digital control signal having the PWM value from the loop filter 45. In this case, a circuit operated in the same manner as the external control LSI placed on the outside is prepared in the inside of the demodulating system.

When the selector selection (selector 48e, selector 48b, selector 45a, selector 47a)=(B,A,A,B) is selected, a value of the digital control signal output from the loop filter 45 is held in the control signal correcting circuit 47 in simultaneous with the change of the selector selection. Because the digital control signal output from the loop filter 45 is converged in the automatic gain control circuit by using the ideal average power value expressed by the AGCR to held the converged value of the digital control signal in the control signal correcting circuit 47, the converged value held in the control signal correcting circuit 47 denotes a reference value obtained in the case of the transmission line set to an ideal state. Thereafter, a sweep counter value output from the sweep counter is added to the value held in the control signal correcting circuit 47. Thereafter, a sum of the sweep counter value and the value held in the control signal correcting circuit 47 is output to the pulse width modulator 46 through the selector 45a.

Here, the sweep counter value denotes a correction value for the AGCR. That is to say, the AGC control signal AGCPWM output from the pulse width modulator 46, in which the sum of the sweep counter value and the value held in the control signal correcting circuit 47 is received through the selector 45a, differs from that output from the pulse width modulator 46, in which the digital control signal produced from the AGCR is received without receiving the output of the control signal correcting circuit 47, by a correction value.

In the sweep operation for outputting the sum of the sweep counter value and the value held in the control signal correcting circuit 47 to the pulse width modulator 46 through the selector 45a, the external control LSI always monitors the bit error rate of the bit string data output from the decoder 19 while changing the sweep counter value within a preset range while. When the change of the sweep counter value within all the preset range is completed, the sweep operation is stopped. Thereafter, a specific sweep counter value, at which the monitored bit error rate of the bit string data output from the decoder 19 is minimized, is detected, and the sweep counter value is fixed to the specific sweep counter value (step ST4). In this sweep operation, the sweep counter value is changed within the preset range around zero. However, the preset range is changed according to use environments of the modulating system and is preset in the external control LSI by considering the use environments of the modulating system. Also, any initial sweep counter value output from the sweep counter is available on condition that the initial sweep counter value is set within the preset range.

During the sweep operation, the optimum reference value generating circuit 48 is operated in the same manner as the operation in the selector selection (selector 48e, selector 48b, selector 45a, selector 47a)=(B,A,B,A). In detail, the AGCR selected in the selector 48e is output to the adder 43. Also, the zero value selected in the selector 48b is sent to the adder 48d through the loop filter 48c, the AGCR is added to the zero value, and the output of the adder 48d is sent to the selector 48e. However, because the AGCR is selected in the selector 48e, the output of the adder 48d has no influence on the automatic gain control circuit.

After the specific sweep counter value is set in the sweep counter so as to minimize the bit error rate of the bit string data output from the decoder 19, the selector selection is changed to (selector 48e, selector 48b, selector 45a, selector 47a)=(A,B,A,B), and an optimum reference value generating operation is performed.

In cases where the carrier recovery is converged in the same operation as that of the conventional automatic gain control circuit in the selector selection (selector 48e, selector 48b, selector 45a, selector 47a)=(B,A,B,A), an average value of the power differences output from the adder 43 is almost equal to zero at a point R. This means that an average power value of an ideal modulated signal, or the AGCR, is almost equal to an average power value of the modulated signal actually received in the modulating system. However, when the selector selection (selector 48e, selector 48b, selector 45a, selector 47a)=(A,B,A,B) is adopted to perform an optimum reference value generating operation, because the average power value of the modulated signal actually received in the modulating system is corrected by the specific sweep counter value output from the sweep counter, the AGCR differs from the average power value of the modulated signal actually received in the modulating system, and an average value of the power differences at the point R does not agree with zero. To make an average value of the power differences at the point R agree with zero, the optimum reference value generating circuit 48 is operated to correct the AGCR input to the adder 13 in the optimum reference value generating operation.

In detail, when the selector selection (selector 48e, selector 48b, selector 45a, selector 47a)=(A,B,A,B) is set, the power difference initially not equal to zero at the point R is multiplied by a gain in the multiplier 48a of the optimum reference value generating circuit 48 for each symbol, a multiplied power difference is transmitted to the adder 48d through the loop filter 48c, the AGCR is added to the multiplied power difference in the adder 48d, and the sum of the multiplied power difference and the AGCR is sent to the adder 43 through the selector 48e. In this case, because the gain in the multiplier 48a is adjusted so as to reduce an average of the power differences at the point R to zero, the multiplied power difference output from the loop filter 48c is finally converged to the average of the power differences at the point R (step ST5). In other words, the multiplied power difference output from the loop filter 48c is finally converged to zero. Therefore, the average value of the power differences output from the adder 43 is finally converged to zero in the optimum reference value generating operation. Here, the multiplied power difference output from the loop filter 48c denotes a correction value for the AGCR.

Thereafter, the selector selection (selector 48e, selector 48b, selector 45a, selector 47a)=(A,A,B,B) is adopted. In this case, because the fixed value of zero is selected in the selector 48b, the value output from the loop filter 48c is fixed, and a sum of the AGCR and a correction value for the AGCR is output from the selector 48e to the adder 43. Also, the average value of the multiplied values, which is output from the multiplier 44 just before the selector selection of (selector 48e, selector 48b, selector 45a, selector 47a)=(A,A,B,B), is held in the loop filter 45. Therefore, an AGC control signal AGCPWM having an optimum AGC control value is output from the automatic gain control circuit to both the AGC amplifier 3 and an AGC amplifier of the tuner 1.

As is described above, in the first embodiment, when the AGC control signal for controlling both the AGC amplifier 3 and the AGC amplifier of the tuner 1 is converged in the selector selection (selector 48e, selector 48b, selector 45a, selector 47a)=(B,A,B,A), the AGC control signal is corrected in the selector selection (selector 48e, selector 48b, selector 45a, selector 47a)=(B,A,A,B) so as to minimize the bit error rate of the bit string data output from the decoder 19 of the demodulating circuit 7. Thereafter, when the correction of the AGC control signal is completed, the AGCR input to the adder 13 is corrected in the selector selection (selector 48e, selector 48b, selector 45a, selector 47a)=(A,B,A,B) so as to reduce an average value of the power differences output from the adder 13 to zero, and the correction value for the AGCR is fixed in the selector selection (selector 48e, selector 48b, selector 45a, selector 47a)=(A,A,B,B) to output the AGC control signal having the optimum amplitude to both the AGC amplifier 3 and the AGC amplifier of the tuner 1.

Therefore, the amplitude of the modulated signal input to the A/D converter 6 becomes stable so as to be appropriately within the dynamic range of the A/D converter 6, the A/D conversion is performed for the modulated signal in the A/D converter 6 with high precision, the decoding in the decoder 19 of the demodulating circuit 7 is correctly performed to produce bit string data, a bit error rate of the bit string data output from the decoder 19 is lessened so as to be lower than the allowable error bit rate of the error correcting circuit 20, and the bit error included in the bit string data can be perfectly corrected in the error correcting circuit 20. Accordingly, the demodulating circuit 7 can be stably operated while minimizing the bit error rate of the bit string data output from the decoder 19 of the demodulating circuit 7.

In this embodiment, the pieces of symbol information I of the in-phase components and the pieces of symbol information Q of the quadrature components output from the LPFs 13 and 14 are input to the automatic gain control circuit. However, it is applicable that the pieces of symbol information I of the in-phase components corrected in the de-rotator 15 and the pieces of symbol information Q of the quadrature components corrected in the de-rotator 15 be input to the automatic gain control circuit.

Embodiment 2

In the first embodiment, the sweep counter value output from the external control LSI is added to the digital control signal of the loop filter 45 in the control signal correcting circuit 47. However, in a second embodiment, the external control LSI has the function of the control signal correcting circuit 47.

Figure 3:
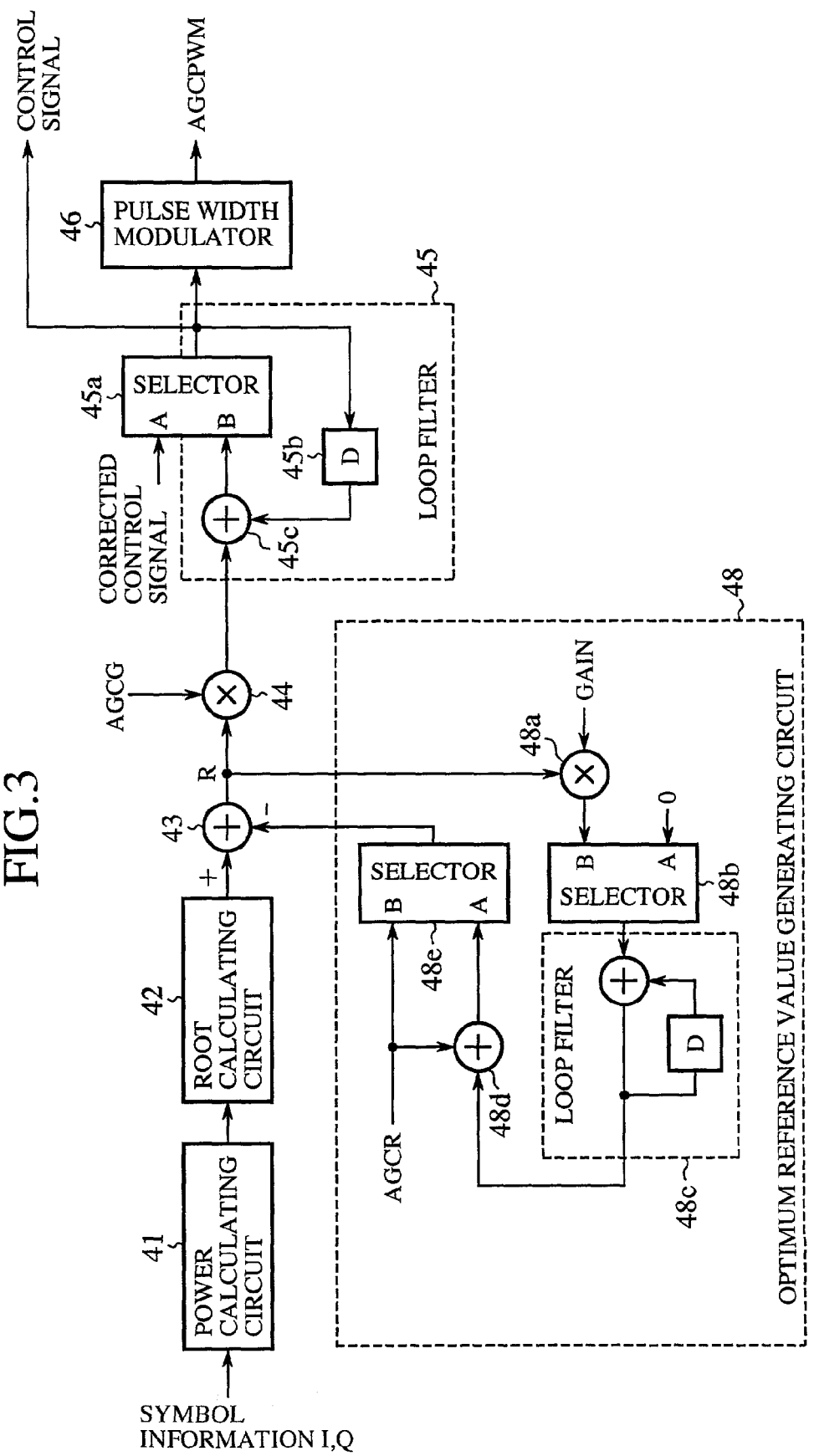
FIG. 3 is a constitutional view showing an automatic gain control circuit arranged in a demodulating circuit according to a second embodiment of the present invention.

FIG. 3 is a constitutional view showing an automatic gain control circuit arranged in the demodulating circuit according to a second embodiment of the present invention.

As shown in FIG. 3, the digital control signal output from a terminal LOOPOUT of the loop filter 45 is received in the external control LSI, the digital control signal is corrected in the external control LSI, and a corrected digital control signal is input to the terminal A of the selector 45a.

Therefore, in the same manner as in the first embodiment, the demodulating circuit 7 can be stably operated while minimizing the bit error rate of the bit string data output from the decoder 19 of the demodulating circuit 7.

Embodiment 3

In the first and second embodiments, the multiplier 48a is arranged in the optimum reference value generating circuit 48, and the power difference of each symbol is multiplied by a gain. However, the multiplier 48a is not necessary in the present invention.

Figure 4:
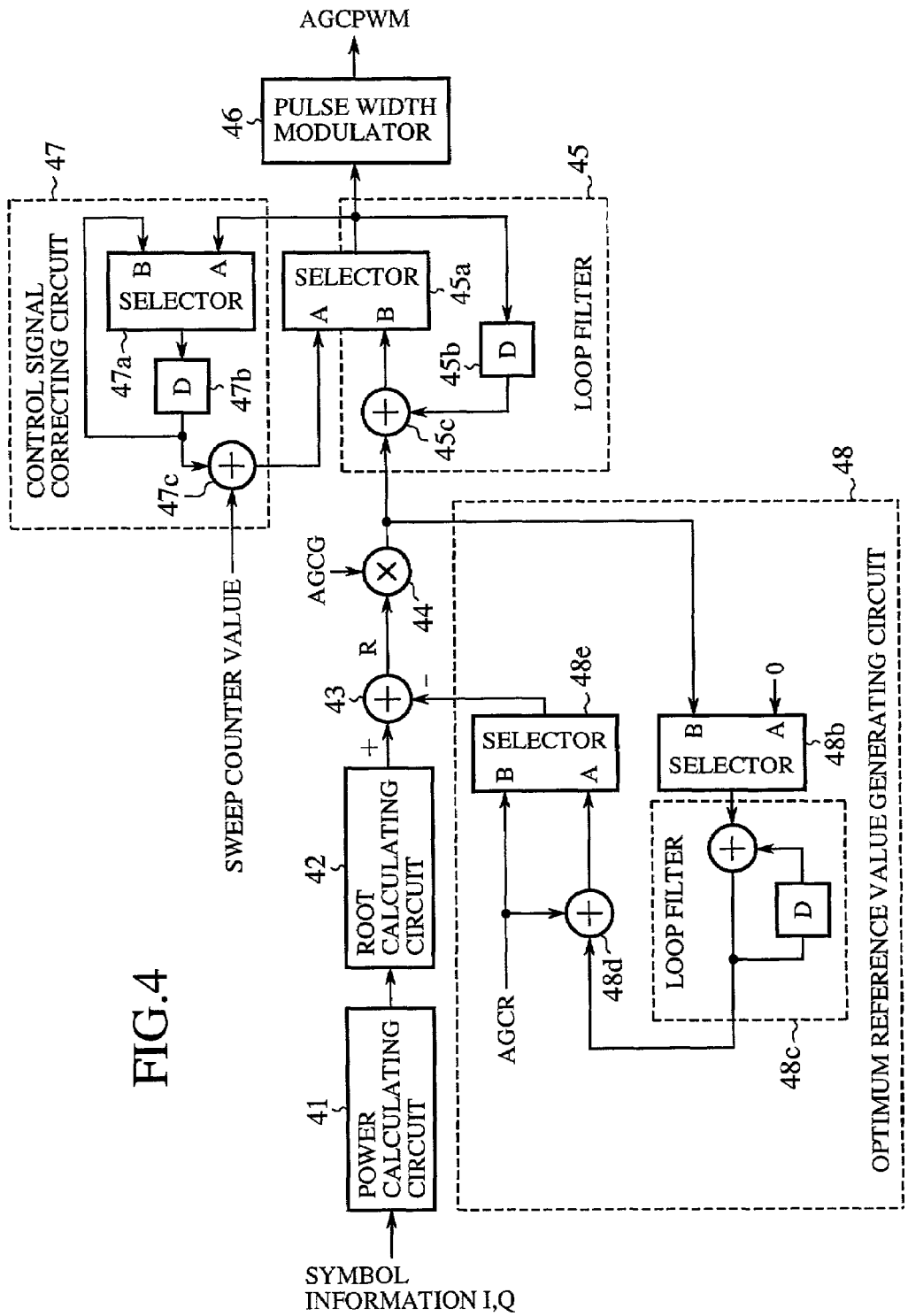
FIG. 4 is a constitutional view showing an automatic gain control circuit arranged in a demodulating circuit according to a third embodiment of the present invention.
Figure 5:
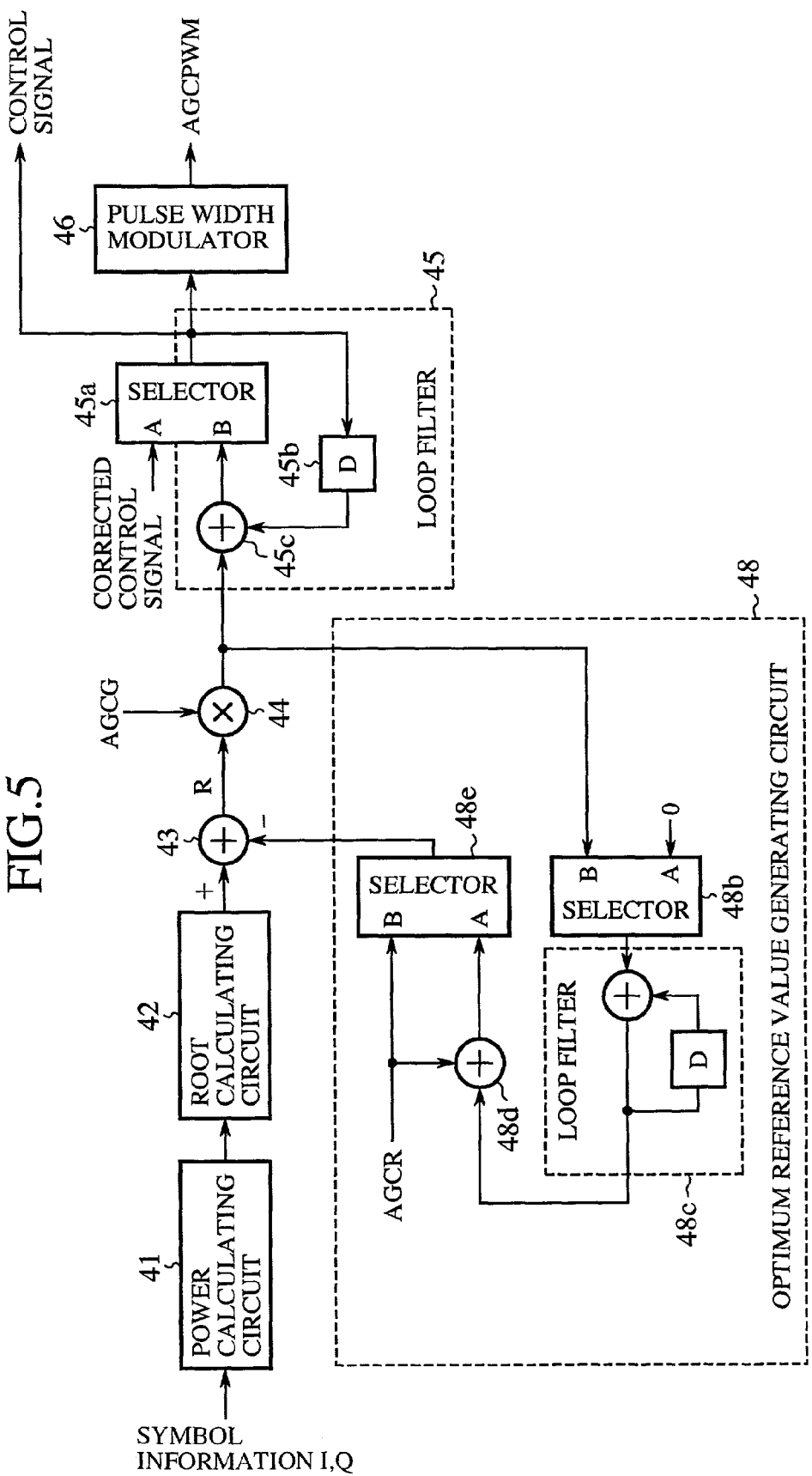
FIG. 5 is a constitutional view showing an automatic gain control circuit arranged in a demodulating circuit according to a modification of the third embodiment.
Figure 6:
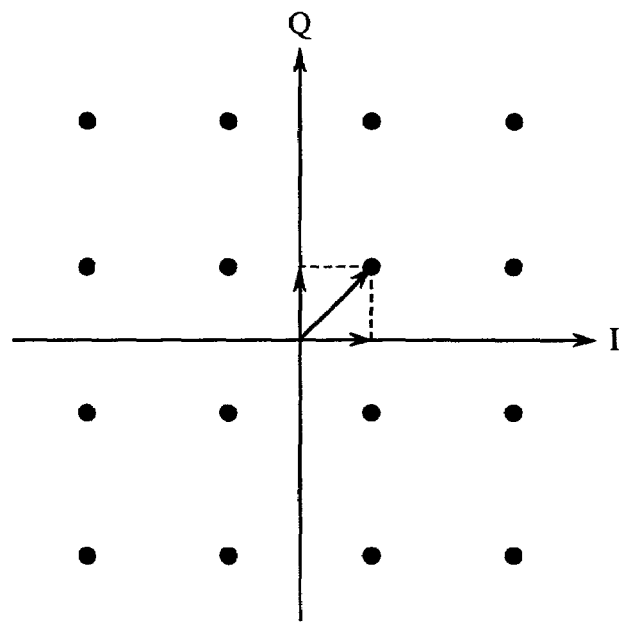
FIG. 6 is a graphic view showing the vector location according to 16-point QAM in which four values are given to each of an in-phase signal and a quadrature signal.
Figure 7:
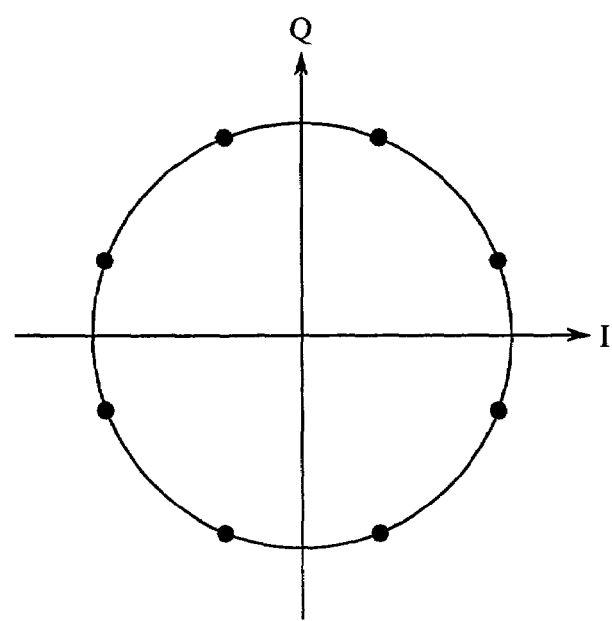
FIG. 7 is a graphic view showing the vector location according to 8-phase PSK in which the phase of an in-phase signal and the phase of a quadrature signal are respectively divided into eight pieces.

FIG. 4 is a constitutional view showing an automatic gain control circuit arranged in the demodulating circuit according to a third embodiment of the present invention, and FIG. 5 is a constitutional view showing an automatic gain control circuit arranged in the demodulating circuit according to a modification of the third embodiment.

As shown in FIG. 4 and FIG. 5, a multiplied value of the multiplier 44 is directly input to the terminal B of the selector 48b, and the multiplier 48a is omitted. In this case, the AGCG is adjusted so as to reduce an average of the power differences output from the adder 43 to zero.

Therefore, in the same manner as in the first and second embodiments, the demodulating circuit 7 can be stably operated while minimizing the bit error rate of the bit string data output from the decoder 19 of the demodulating circuit 7.

What is claimed is:

1. An automatic gain control (AGC) circuit of a demodulating circuit, which has an automatic gain control amplifier for adjusting a gain of a modulated signal, comprising:
    difference detecting means for calculating a plurality of power values of pieces of symbol information of in-phase components and quadrature components of the modulated signal and detecting a power difference between each calculated power value and an ideal power value;
    control means for producing an AGC control signal to reduce an average value of the power differences detected by the difference detecting means to zero by controlling the automatic gain control amplifier according to the AGC control signal;
    first correcting means for minimizing a bit error rate of data, which is obtained from the modulated signal in the demodulating circuit, by correcting the AGC control signal produced by the control means; and
    second correcting means for correcting the ideal power value to reduce an average value of the power differences detected by the difference detecting means, in which the power differences are detected from the modulated signal adjusted by the automatic gain control amplifier according to the AGC control signal corrected by the first correcting means, to zero, wherein each power difference detected by the difference detecting means is multiplied by a prescribed gain by the second correcting means to produce a multiplied value, the multiplied value is transmitted through a loop filter of the second correcting means, the multiplied value transmitted through the loop filter is added to the ideal power value to produce a corrected ideal power value and to detect power differences produced from the corrected ideal power value.

2. An automatic gain control circuit according to claim 1, wherein the bit error rate of the data is monitored by the first correcting means while a correction value added to the AGC control signal to correct the AGC control signal is changed, and the correction value is fixed to a specific correction value by the first correcting means on condition that the bit error rate of the data is minimized by adding the specific correction value to the AGC control signal.

3. An automatic gain control circuit according to claim 2, wherein the correction value is changed under control of an external control unit by the first correcting means.

4. An automatic gain control circuit according to claim 1, wherein the first correcting means has an external control unit for correcting the AGC control signal.

5. An automatic gain control (AGC) method, comprising the steps of:
    calculating a plurality of power values of pieces of symbol information of in-phase components and quadrature components of a modulated signal;
    detecting a power difference between each power value and an ideal power value;
    producing an AGC control signal to reduce an average value of the power differences to zero by adjusting a gain of the modulated signal according to the AGC control signal;
    minimizing a bit error rate of data, which is obtained from the modulated signal, by correcting the AGC control signal to a corrected AGC control signal; and
    correcting the ideal power value after the completion of the minimization of the bit error rate to reduce an average value of the power differences, which are detected from the modulated signal adjusted according to the corrected AGC control signal, to zero,
    wherein the step of correcting the ideal power value comprises the steps of:
        multiplying the power difference between each power value and the ideal power value by a prescribed gain to produce a multiplied value;
        transmitting the multiplied value through a loop filter; and
        adding the multiplied value transmitted through the loop filter to the ideal power value to produce a corrected ideal power value and to detect power differences produced from the corrected ideal power value.

6. An automatic gain control method according to claim 5, wherein the step of minimizing the bit error rate of the data comprises the steps of:
    monitoring the bit error rate of the data while a correction value added to the AGC control signal to correct the AGC control signal is changed; and
    fixing the correction value to a specific correction value on condition that the bit error rate of the data is minimized by adding the specific correction value to the AGC control signal.

7. An automatic gain control method according to claim 6, wherein the step of monitoring the bit error rate comprises the step of changing the correction value under control of an external control unit.

8. An automatic gain control method according to claim 5, wherein the step of minimizing the bit error rate of the data comprises the step of correcting the AGC control signal under control of an external control unit.

* * * * *